(12) United States Patent
Dong (10) Patent No.: US 10,705,780 B2
(45) Date of Patent: Jul. 7, 2020

(54) METHOD, DEVICE, AND STORAGE MEDIUM FOR DISPLAYING APPLICATION PAGE

(71) Applicant: BEIJING XIAOMI MOBILE SOFTWARE CO., LTD., Beijing (CN)

(72) Inventor: Hongguang Dong, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 15/995,690

(22) Filed: Jun. 1, 2018

(65) Prior Publication Data

US 2018/0364964 A1 Dec. 20, 2018

(30) Foreign Application Priority Data

Jun. 14, 2017 (CN) .......................... 2017 1 0448429

(51) Int. Cl.
| | | |
|---|---|---|
| G06F 3/14 | (2006.01) |
| G06F 16/903 | (2019.01) |
| H04L 29/08 | (2006.01) |
| G06F 8/61 | (2018.01) |
| G06F 16/951 | (2019.01) |
| G06F 9/445 | (2018.01) |

(52) U.S. Cl.
CPC .................. *G06F 3/14* (2013.01); *G06F 8/61* (2013.01); *G06F 9/44505* (2013.01); *G06F 16/903* (2019.01); *G06F 16/951* (2019.01); *H04L 67/02* (2013.01); *H04L 67/34* (2013.01); *G06T 2200/16* (2013.01); *G06T 2200/24* (2013.01); *H04L 67/2842* (2013.01)

(58) Field of Classification Search
None
See application file for complete search history.

(56) References Cited

U.S. PATENT DOCUMENTS 8,887,132 B1 * 11/2014 Hunter ................ G06F 9/44505
717/111
9,170,784 B1 * 10/2015 Friedman .................. G06F 8/30
9,734,513 B1 * 8/2017 Mehr ................. G06Q 30/0241
(Continued)

FOREIGN PATENT DOCUMENTS

CN 103176775 A 6/2013
CN 105009070 A 10/2015
(Continued)

OTHER PUBLICATIONS

Extended European search report issued in corresponding European Application No. 18177549.5, dated Nov. 20, 2018, 10 pages.
(Continued)

*Primary Examiner* — Phong X Nguyen
(74) *Attorney, Agent, or Firm* — Arch & Lake LLP (57) ABSTRACT

The present disclosure discloses a method, device and storage medium for displaying an application page. The method includes: displaying a designated entry of an application, acquiring a configuration file of the application when a triggering operation to the designated entry is detected, and generating a native page of the application for a terminal according to the configuration file of the application and displaying the native page of the application on the terminal when the application is not installed one the terminal.

18 Claims, 6 Drawing Sheets

(56) References Cited

U.S. PATENT DOCUMENTS

| | | | |
|---|---|---|---|
| 10,182,102 B1* | 1/2019 | Miller | H04L 67/10 |
| 10,210,263 B1* | 2/2019 | Yeom | G06F 16/9535 |
| 10,275,798 B1* | 4/2019 | Clark | G06F 16/9558 |
| 2003/0204843 A1* | 10/2003 | Barmettler | G06F 9/44526 |
| | | | 717/178 |
| 2012/0047425 A1* | 2/2012 | Ahmed | G06F 40/174 |
| | | | 715/234 |
| 2012/0174092 A1* | 7/2012 | Faisst | G06F 8/61 |
| | | | 717/174 |
| 2013/0013671 A1* | 1/2013 | Relan | G06F 9/452 |
| | | | 709/203 |
| 2013/0167111 A1* | 6/2013 | Moore | G06F 9/451 |
| | | | 717/105 |
| 2013/0212191 A1* | 8/2013 | Suraj | H04L 51/32 |
| | | | 709/206 |
| 2014/0040226 A1 | 2/2014 | Sadhukha et al. | |
| 2014/0109115 A1* | 4/2014 | Low | G06F 9/44526 |
| | | | 719/328 |
| 2014/0149998 A1* | 5/2014 | Kumar | G06F 9/542 |
| | | | 719/318 |
| 2014/0172911 A1* | 6/2014 | Cohen | H04W 4/00 |
| | | | 707/770 |
| 2014/0325340 A1* | 10/2014 | Lin | G06F 16/957 |
| | | | 715/234 |
| 2015/0081764 A1* | 3/2015 | Zhao | H04L 67/08 |
| | | | 709/203 |
| 2015/0121193 A1* | 4/2015 | Beveridge | G06F 3/0481 |
| | | | 715/234 |
| 2015/0242507 A1 | 8/2015 | Shapira et al. | |
| 2016/0092348 A1* | 3/2016 | Straub | G06F 8/61 |
| | | | 717/124 |
| 2016/0124914 A1* | 5/2016 | Deng | G06F 40/205 |
| | | | 715/204 |
| 2016/0142413 A1* | 5/2016 | Diep | G06F 21/51 |
| | | | 726/4 |
| 2017/0091159 A1* | 3/2017 | Su | G06F 17/2247 |
| 2017/0212672 A1* | 7/2017 | Bloch | G06F 40/14 |
| 2017/0269916 A1* | 9/2017 | Singhal | G06F 9/46 |
| 2018/0034688 A1* | 2/2018 | Lee | H04L 41/0803 |
| 2018/0097974 A1* | 4/2018 | Zweig | A63F 13/61 |
| 2018/0359390 A1* | 12/2018 | Kawabata | H04L 67/42 |

FOREIGN PATENT DOCUMENTS

| | | |
|---|---|---|
| CN | 105956067 A | 9/2016 |
| CN | 105988846 A | 10/2016 |
| CN | 106201610 A | 12/2016 |
| EP | 3239858 A1 | 11/2017 |

OTHER PUBLICATIONS

First Office Action to EP Application No. 18177549.5, dated Sep. 2, 2019, (9p).

First Office Action issued to Chinese Patent Application No. 201710448429.0 dated Feb. 25, 2020 with English translation, (14p).

* cited by examiner

METHOD, DEVICE, AND STORAGE MEDIUM FOR DISPLAYING APPLICATION PAGE

CROSS-REFERENCE TO RELATED APPLICATIONS

This application claims a priority to and benefits of Chinese Patent Application Serial No. 201710448429.0, filed with the State Intellectual Property Office of P. R. China on Jun. 14, 2017, the entire content of which is incorporated herein by reference for all purposes.

TECHNICAL FIELD

The present disclosure generally relates to the field of computer technology, and more particularly to a method, device and storage medium for displaying an application page.

BACKGROUND

With the development of electronic technology and the increasingly improved configuration of a smart terminal, a variety of applications can be installed in the terminal to display pages of various applications for a user. However, with application functions gradually improved, the storage space occupied by applications is gradually increasing, and it is likely to adversely affect a normal operation of an operating system operated on the terminal.

SUMMARY

The present disclosure provides a method, device and storage medium for displaying an application page.

According to a first aspect of the present disclosure, a method for displaying an application page is provided. The method may include displaying a designated entry of an application; acquiring a configuration file of the application when a triggering operation to the designated entry is detected; and generating a native page of the application for a terminal according to the configuration file of the application and displaying the native page of the application on the terminal when the application is not installed on the terminal.

According to a second aspect of the present disclosure, a device for displaying an application page is provided. The device may include a processor and a memory for storing instructions executable by the processor, where the processor is configured to: display a designated entry of an application, acquire a configuration file of the application when a triggering operation to the designated entry is detected and generate a native page of the application for a terminal according to the configuration file of the application and display the native page of the application on the terminal when the application is not installed on the terminal.

According to a third aspect of the present disclosure, a computer-readable storage medium is provided to store therein at least one instruction that is executable by a processor for displaying an application page. The at least one instruction, when executed, may cause the processor to perform: displaying a designated entry of an application, acquiring a configuration file of the application when a triggering operation to the designated entry is detected, and generating a native page of the application for a terminal according to the configuration file of the application and displaying the native page of the application on the terminal when the application is not installed on the terminal.

It should be appreciated that, the general description hereinbefore and the detailed description hereinafter are explanatory and illustrative, and shall not be construed to limit the present disclosure.

BRIEF DESCRIPTION OF THE DRAWINGS

The accompanying drawings, which are incorporated in and constitute a part of this specification, illustrate examples consistent with the present disclosure and, together with the description, serve to explain the principles of the present disclosure

DETAILED DESCRIPTION

In order to make objects, technical solutions and advantages of the present disclosure clearer, the present disclosure will be described in detail below with reference to drawings and examples, which herein are explanatory, illustrative, and only used to generally understand the present disclosure, and shall not be construed to limit the present disclosure.

In order to reduce the occupied storage space, there is provided an application that can be accessed through the Internet and whose designated entry can be provided by a web browser. When detecting a triggering operation to the designated entry in process of displaying the designated entry, a terminal acquires a configuration file of the application from a Web server, generates a Web pager according to the configuration file and displays the Web pager, so as to achieve the operation of the application in a case that the application is not installed in the terminal.

In examples of the present disclosure, there are provided a method, device and storage medium for displaying an application page. In the following, examples of the present disclosure will be described in detail in combination with drawings.

Figure 1:
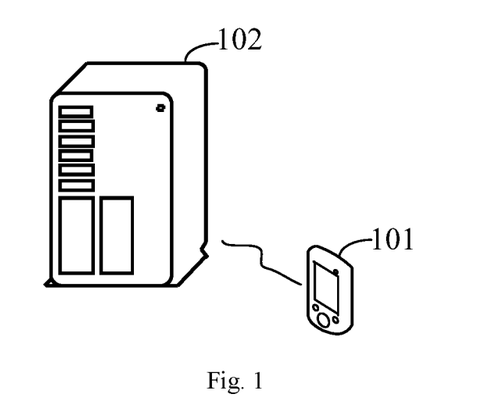
FIG. 1 is a schematic diagram illustrating an implement environment, according to an example.

FIG. 1 is a schematic diagram illustrating an implement environment, according to an example, referring to FIG. 1, the implement environment includes a terminal 101 and a server 102. The terminal 101 may be a device, such as a mobile phone, a computer and a tablet, and an operating system of the terminal may be an android system, a symbian system, and the like. The terminal 101 and the server 102 are connected via a network, the server 102 is configured to distribute one or more applications to the terminal via a network connection, and the terminal 101 is configured to operate one or more applications.

In the server 102, there is stored a configuration file of an application, which includes data and operating logic required for operating the application. The terminal 101 may acquire the configuration file of the application from the server 102, generate a native page of the application according to the configuration file of the application and display the native page of the application, so as to achieve the operation of the application. Moreover, the application may be operated by the terminal, without installation. Data required for operating the application may be acquired from the server 102.

The server 102 may also update the configuration file of the application, so as to provide the terminal 101 with an updated configuration file to allow the terminal 101 to operate the updated application.

In addition, the server 102 may also store an installation file of the application. The terminal 101 may acquire the installation file of the application from the server 102 and operate the application after installing the application according to the installation file. Certainly, the server 102 may update the installation file of the application so as to provide the terminal 101 with an updated installation file, such that the terminal 101 may install the updated application according to the updated installation file.

Figure 2:
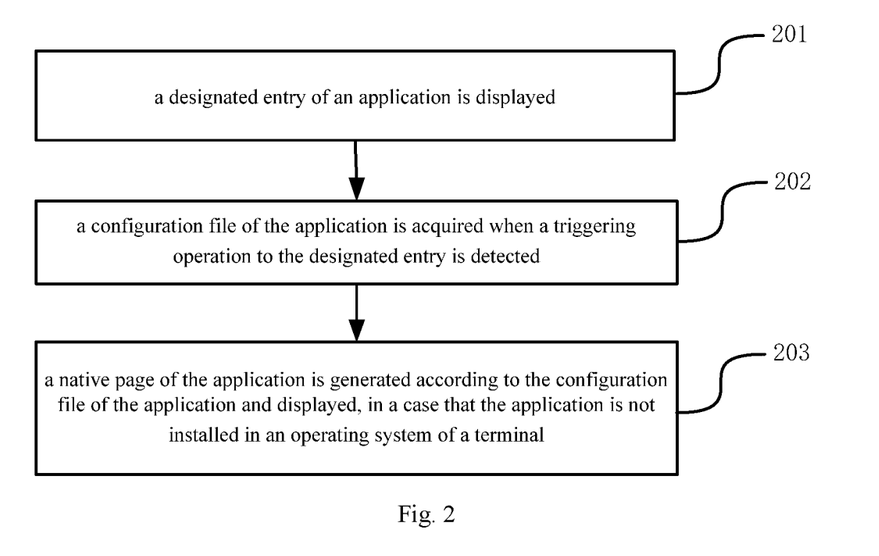
FIG. 2 is a flow chart illustrating a method for displaying an application page, according to an example.

FIG. 2 is a flow chart illustrating a method for displaying an application page, according to an example, referring to FIG. 2, the method includes the followings.

In block 201, a designated entry of an application is displayed.

In block 202, a configuration file of the application is acquired when a triggering operation to the designated entry is detected.

In block 203, a native page of the application is generated according to the configuration file of the application and displayed, in a case that the application is not installed in an operating system of a terminal.

With the method according to this example, the designated entry of the application is displayed; the configuration file of the application is acquired when the triggering operation to the designated entry is detected; and the native page of the application is generated according to the configuration file of the application and the native page of the application is displayed, such that the operation of the application is achieved in the case that the application is not installed in the operating system of the terminal, thereby saving the memory space. Moreover, instead of displaying a web page, the native page of the application is used to simulate the application page under installation, thereby improving the displaying effect.

In an example of the present disclosure, the designated entry is provided by the operating system.

In another example of the present disclosure, displaying a designated entry of the application includes: displaying a searching entry provided by the operating system, and acquiring an application identifier inputted at the searching entry; sending a search request to a server, wherein the search request includes the application identifier, and the server is configured to feed back a configuration file corresponding to the application identifier; and caching the configuration file corresponding to the application identifier when the configuration file corresponding to the application identifier is received and displaying the designated entry.

In another example of the present disclosure, acquiring a configuration file of the application when a triggering operation to the designated entry is detected includes: acquiring the configuration file of the application cached when the triggering operation to the designated entry is detected.

In another example of the present disclosure, the native page of the application includes an option of adding a shortcut, and the method further includes: adding the shortcut on a homepage of the operating system when a triggering operation to the option of adding the shortcut is detected in process of displaying the native page of the application.

In another example of the present disclosure, the configuration file of the application includes a statement describing the application page, and generating a native page of the application according to the configuration file of the application includes: invoking a framework file in the operating system based on the configuration file of the application; and analyzing the statement through the framework file and generating the native page of the application.

An alternatively example may be formed by combining the examples described hereinbefore in any way, and will not be elaborated herein.

Figure 3A:
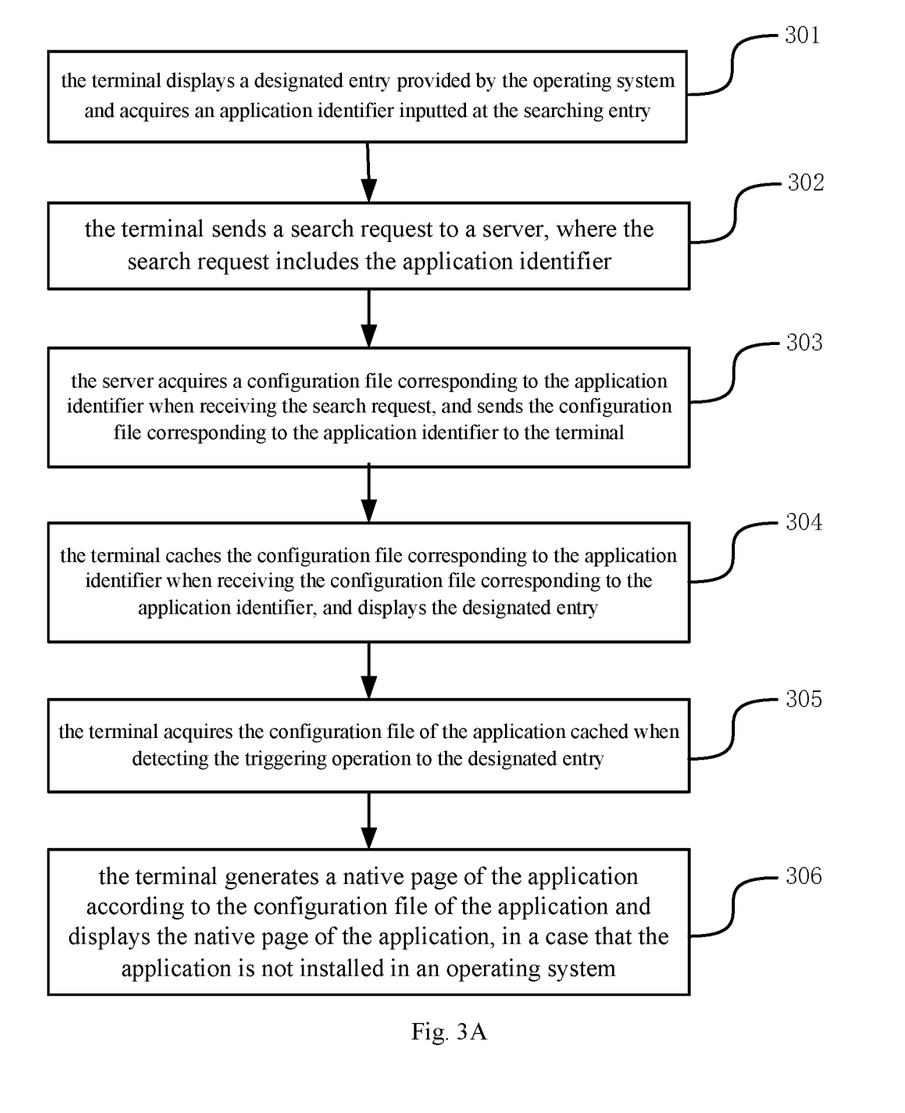
FIG. 3A is a flow chart illustrating a method for displaying an application page, according to an example.

FIG. 3A is a flow chart illustrating a method for displaying an application page, according to an example, referring to FIG. 3, the method is applied in a terminal and includes the followings.

In block 301, the terminal displays a designated entry provided by the operating system and acquires an application identifier inputted at the searching entry.

The searching entry is configured for a global search, such as searching at the terminal locally and searching on a server associated with the terminal, etc.

In an example of the present disclosure, the searching entry is on a search page. If detecting a rightward or leftward sliding operation in process of displaying the homepage of the operating system, the terminal will display the search page, on which the searching entry is displayed.

When the terminal displays the searching entry, users may input a searching keyword in the searching entry according to their own needs so as to search information associated with the searching keyword in the terminal or server. This example is applied in such a case that the application page is displayed. When the terminal displays the searching entry, users input in the searching entry an application identifier corresponding to an application whose page is to be displayed so as to search the application.

The application identifier is a character or character string which may be mapped to at least one application. For example, the application identifier may be an application name, a part of the application name, a synonym of the application name or other words associated with the application, etc. For example, when the user inputs "duokan", it may be mapped to a "duokan" application. Alternatively, the application identifier may also be an application type which can be mapped to applications belonging to the application type. For example, when the user inputs "dushu", it may be mapped to a "duokan" application and a "panda reader" application.

In block 302, the terminal sends a search request to a server, where the search request includes the application identifier.

In block 303, the server acquires a configuration file corresponding to the application identifier when receiving the search request, and sends the configuration file corresponding to the application identifier to the terminal.

In this example, the server stores one or more configuration files of at least one application, which are configured to operate the corresponding application in the case that the application is not installed in the terminal. The terminal sends the search request including the application identifier to the server when acquiring the application identifier inputted by the user, and the server determines the application indicated by the application identifier when receiving the search request, acquires the configuration file of the application from the configuration files stored, and sends the configuration file of the application to the terminal.

In an example of the present disclosure, the server stores not only one or more configuration files of at least one application, but also one or more installation files of the at least one application for installing the corresponding application. In such a case, when receiving the search request and determining the application indicated by the application identifier, the server may further acquire the installation file of the application from the configuration files stored, and sends the installation file of the application to the terminal.

The configuration file and installation file of the application may be uploaded to the server by their developer, and be distributed to users through the server.

In block 304, the terminal caches the configuration file corresponding to the application identifier when receiving the configuration file corresponding to the application identifier, and displays the designated entry.

The terminal may set a memory space to store the configuration file corresponding to the application identifier when receiving the configuration file corresponding to the application identifier fed back from the server. Subsequently, the terminal may operate the application based on configuration file corresponding to the application identifier. Moreover, the terminal may display the designated entry associated with the configuration file corresponding to the application identifier as a searching result of the application identifier, where the designated entry is configured to trigger the operation of the corresponding application in the case that the application is not installed.

In an example of the present disclosure, if receiving the installation file of the application fed back from the server, the terminal may also store the installation file and display an installation entry associated with the installation file as a searching result of the application identifier, where the installation entry is configured to trigger the installation of the corresponding application.

In the practical application, for one application, the server may provide a configuration file and an installation file of the application, and the terminal may simultaneously display a designated entry and an installation entry for user selection when receiving the configuration file and the installation file, where the designated entry and the installation entry may be in various forms, such as buttons, icons, and menu items. In such a case, the user may trigger the designated entry to operate the application or trigger the installation entry to operate the application after installing the application.

Furthermore, the designated entry and the installation entry may be provided by the operating system of the terminal or by a browser or other third-party applications installed in the terminal, which will not be limited by the present disclosure.

In block 305, the terminal acquires the configuration file of the application cached when detecting the triggering operation to the designated entry.

The triggering operation may be a click operation or a long press operation. When the terminal detects the triggering operation to the designated entry, which indicates that the user wants to directly operate the application without installing the application, the terminal acquires the configuration file cached and associated with the designated entry from the memory space.

It should be illustrated that, in order to facilitate the user to understand the application, the terminal may also display brief information of the application when detecting the triggering operation to the designated entry for the first time, where the brief information may include such as function information, developer information and permission information of the application. For example, the brief information may be "the duokan application is provided by XX Company for users to read e-book without installing the duokan application, and the application may use speaker and camera permissions". After the brief information is displayed, the following block 306 is performed to display a native page of the application.

In block 306, the terminal generates a native page of the application according to the configuration file of the application and displays the native page of the application, in a case that the application is not installed in an operating system.

The configuration file of the application includes a statement describing the application page, and the statement includes data required for displaying the application page and operating logic required for operating the application page.

The data is realized based on the Hyper Text Markup Language 5 (HTML5), and may include one or more display elements that need to be displayed on the application page, layout information of the one or more display elements, a resource address required for displaying the one or more display elements, etc. The layout information may include information regarding such as location, size, and color of the individual display element. The resource address may be an address of a local resource stored in the terminal or a link address of a resource stored in the server The operating logic is realized based on the Java Script language, and may include an address of a page to be jumped to or an operation required to be executed when the display element is clicked, or an operation required to be executed when the page is slided up and down.

The terminal is capable of generating a Web page corresponding to the statement after analyzing the statement through a browser kernel locally configured. However, the Web page has a poor displaying effect, cannot bring users a native page experience. In order to improve the displaying effect, in this example, the terminal generates a native page according to the statement in the configuration file and displays the native page, instead of displaying the Web page.

The terminal may invoke, based on the configuration file of the application, a framework file in the operating system, through which the statement in the configuration file of the application is analyzed into a HTML5 language-based display element; convert the obtained HTML5 language-based display element into a native-based view according to a correspondence set in the framework file between the HTML5 language-based display element and the native-based view; and generate a native page by performing page rendering according to the obtained native-based view and display the native page.

The framework file may be realized by a code through which the above function is achieved. As one or more program modules, the framework file may be built in the operating system by a developer of the operating system when the operating system is released or installed in the operating system by the user.

In an example of the present disclosure, the terminal may include an executing layer, a converting layer, and a native layer. The executing layer analyzes the statement in the configuration file of the application into several HTML5 language-based display elements and generates a first virtual tree structure including the several HTML5 language-based display elements. The converting layer converts the several HTML5 language-based display elements in the first virtual tree structure into several views recognizable by the native layer to obtain a second tree structure including the several views. The native layer performs page rendering according to the second tree structure to display the native page.

The application page is displayed after converted into the native page, such that the terminal is capable of providing the user with an experience like browsing the application page of an installed application in a case that the application is not installed actually, thereby not only saving the memory space, but also ensuring the displaying effect of the native page.

It should be illustrated that, this example takes an entry obtained by searching the application identifier as an example of the designated entry. Actually, the designated entry may also be a shortcut of the application. For example, after the block 306, the method may further include the followings: in process of displaying the native page of the application, the native page includes an option of adding a shortcut, which is configured to indicate adding the shortcut. The terminal adds the shortcut on a homepage of the operating system when detecting a triggering operation to the option of adding the shortcut. After the terminal quits the native page, the shortcut of the application will be displayed on the homepage of the operating system as the designated entry of the application. The terminal acquires the configuration file of the application cached when detecting a triggering operation to the shortcut, generates the native page of the application according to the configuration file of the application and displays the native page of the application, in a case that the application is not installed in an operating system of a terminal. In such a case, the user does not need to input the application identifier and perform a search with the application identifier, thereby simplifying operation and improving efficiency.

It should be further illustrated that, this example is explained by taking such as case that the terminal acquires the configuration file from the server as an example. However, in the practical application, the terminal will cache the configuration file after acquiring the configuration file for the first time. Thus, the terminal may directly display the designated entry when acquiring the application identifier inputted at the searching entry by the user again and may also directly display the native page according to the configuration file cached when detecting the triggering operation to the designated entry, without sending the search request to the server.

Certainly, in order to save the memory space, the terminal is capable of recording the last use of the configuration file, if a time interval between the last use and the current use of the configuration file exceeds a preset time interval, illustrating that the application corresponding to the configuration file has not been operated for a long time, the configuration file will be deleted from the memory space. The configuration file may be obtained from the server again when the user searches the application through the searching entry next time.

With the method according to examples of the present disclosure, the designated entry of the application is displayed; the configuration file of the application is acquired; and the native page of the application is generated according to the configuration file of the application when the triggering operation to the designated entry is detected and the native page of the application is displayed, such that the operation of the application is achieved in the case that the application is not installed in the operating system of the terminal, thereby saving the memory space, moreover. Moreover, instead of displaying a web page, the native page of the application is used to simulate the application page under installation, thereby improving the displaying effect.

Based on the method for displaying the application page described in the above example shown in FIG. 3A, in this example, there are provided exemplary operating procedures as follows.

Figure 3B:
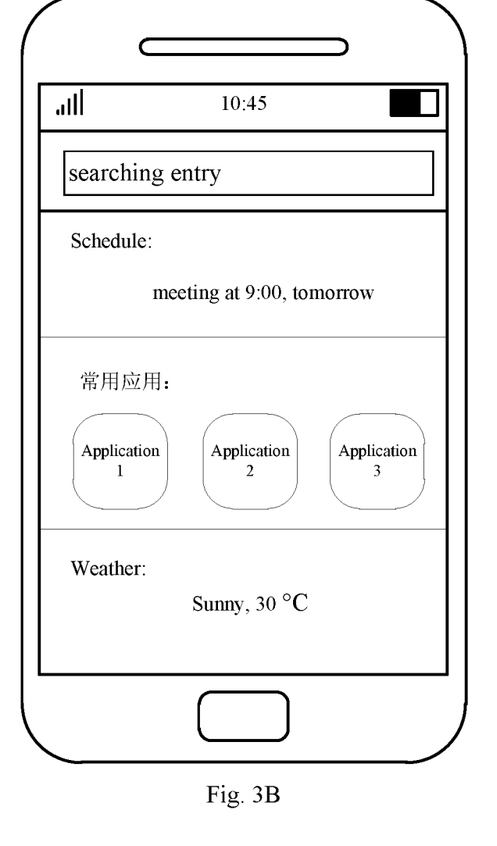
FIG. 3B is a schematic diagram illustrating a searching entry, according to an example.

1. A terminal displays a search page as shown in FIG. 3B, which includes a searching entry, and also includes schedule information, common applications, and weather information.

2. A user inputs "duokan" in the search entry. The terminal obtains an installation file and a configuration file of a "duokan" application from a server and displays two searching results below the search entry on the search page.

Figure 3C:
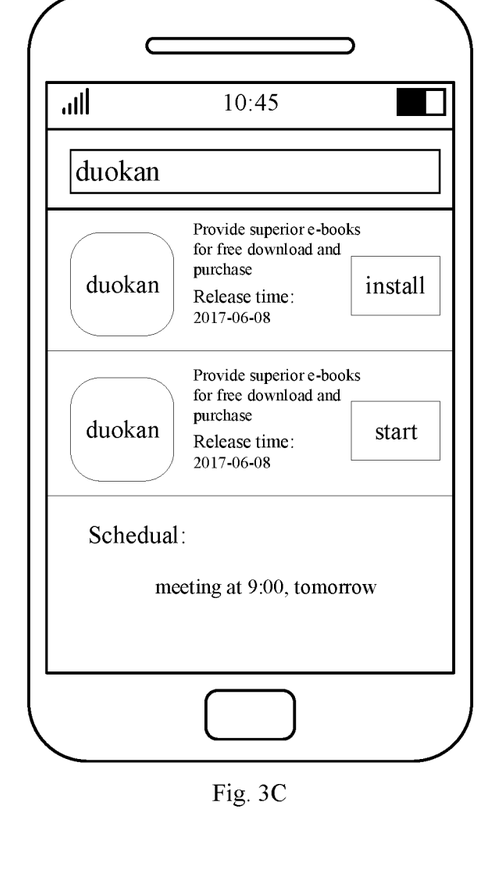
FIG. 3C is a schematic diagram illustrating a designated entry and an installation entry, according to an example.

Referring to FIG. 3C, the two searching results each include an icon, brief information and publication time of the "duokan" application, except that one searching result includes an installation entry "install" for the user to trigger the installation of the "duokan" application, and another searching result includes a designated entry "start" for the user to trigger the operation of the "duokan" application.

3. The terminal displays a native page of the "duokan" application according to the configuration file after the user clicks the "start".

In another example, the terminal installs the "duokan" application according to the installation file after the user clicks the "install".

Figure 3D:
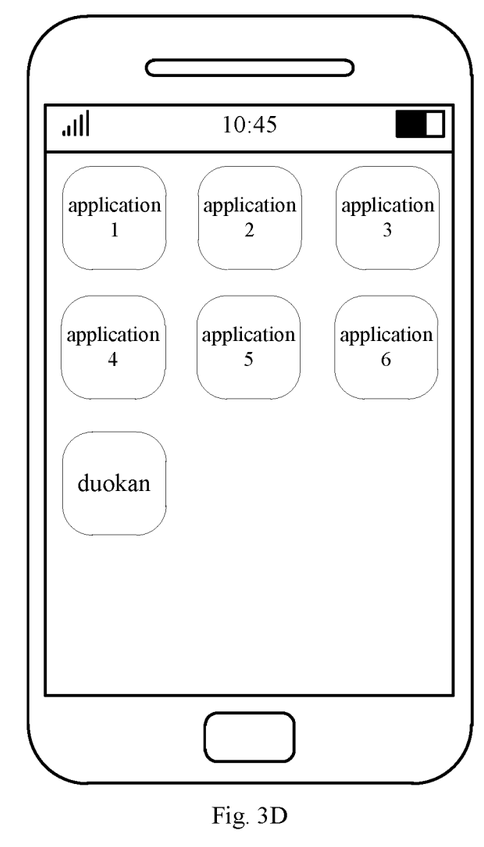
FIG. 3D is a schematic diagram illustrating a shortcut, according to an example.

4. The terminal quits the native page when the user clicks an option of adding a shortcut in process of displaying the native page and displays a homepage as shown in FIG. 3D, which includes the shortcut of the "duokan" application besides several other application icons.

Figure 4:
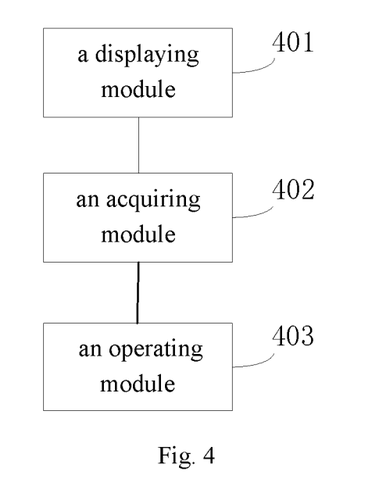
FIG. 4 is a block diagram illustrating a device for displaying an application page, according to an example.

FIG. 4 is a block diagram illustrating a device for displaying an application page, according to an example. Referring to FIG. 4, the device includes a displaying module 401, an acquiring module 402 and an operating module 403.

The displaying module 401 is configured to display a designated entry of the application.

The acquiring module 402 is configured to acquire a configuration file of the application when a triggering operation to the designated entry is detected.

The operating module 403 is configured to generate a native page of the application according to the configuration file of the application and to display the native page of the application, in a case that the application is not installed in an operating system of a terminal.

With the device according to examples of the present disclosure, the designated entry of the application is displayed; the configuration file of the application is acquired; and the native page of the application is generated according to the configuration file of the application when the triggering operation to the designated entry is detected and the native page of the application is displayed, such that the operation of the application is achieved in the case that the application is not installed in the operating system of the terminal, thereby saving the memory space, Moreover, instead of displaying a web page, the native page of the application is used to simulate the application page under installation, thereby improving the displaying effect.

In an example of the present disclosure, the designated entry is provided by the operating system of the terminal.

In another example of the present disclosure, the displaying module 401 is configured to: display a searching entry provided by the operating system, and acquire an application identifier inputted at the searching entry; send a search request to a server, where the search request includes the application identifier, and the server is configured to feed back a configuration file corresponding to the application identifier; and cache the configuration file corresponding to the application identifier when the configuration file corresponding to the application identifier is received and display the designated entry.

In another example of the present disclosure, the acquiring module 402 is configured to acquire the configuration file of the application cached when the triggering operation to the designated entry is detected.

In another example of the present disclosure, the native page of the application includes an option of adding a shortcut, and the displaying module 401 is further configured to add the shortcut on a homepage of the operating system when a triggering operation to the option of adding the shortcut is detected in process of displaying the native page of the application.

In another example of the present disclosure, the configuration file of the application includes a statement describing the application page, and the operating module 403 is configured to invoke a framework file in the operating system based on the configuration file of the application; and to analyze the statement through the framework file and generate the native page of the application, in a case that the application is not installed in the operating system.

With respect to the devices in the above examples, the specific manners for performing operations for individual modules therein have been described in detail in the examples regarding the methods, which will not be elaborated herein.

It should be understood that the device for displaying the application page described in above examples is illustrated only in accordance with the individual function modules. In the actual implementation, the above functions can be completed depending on the requirements by different function modules. That is, the internal configuration of the terminal can be divided into different function modules to complete all of functions or the part of functions described above. Furthermore, the device for displaying the application page described in above examples belongs to the same conception as the method for displaying the application page, reference can be made to the above examples of the method. It is no more tautology here.

Figure 5:
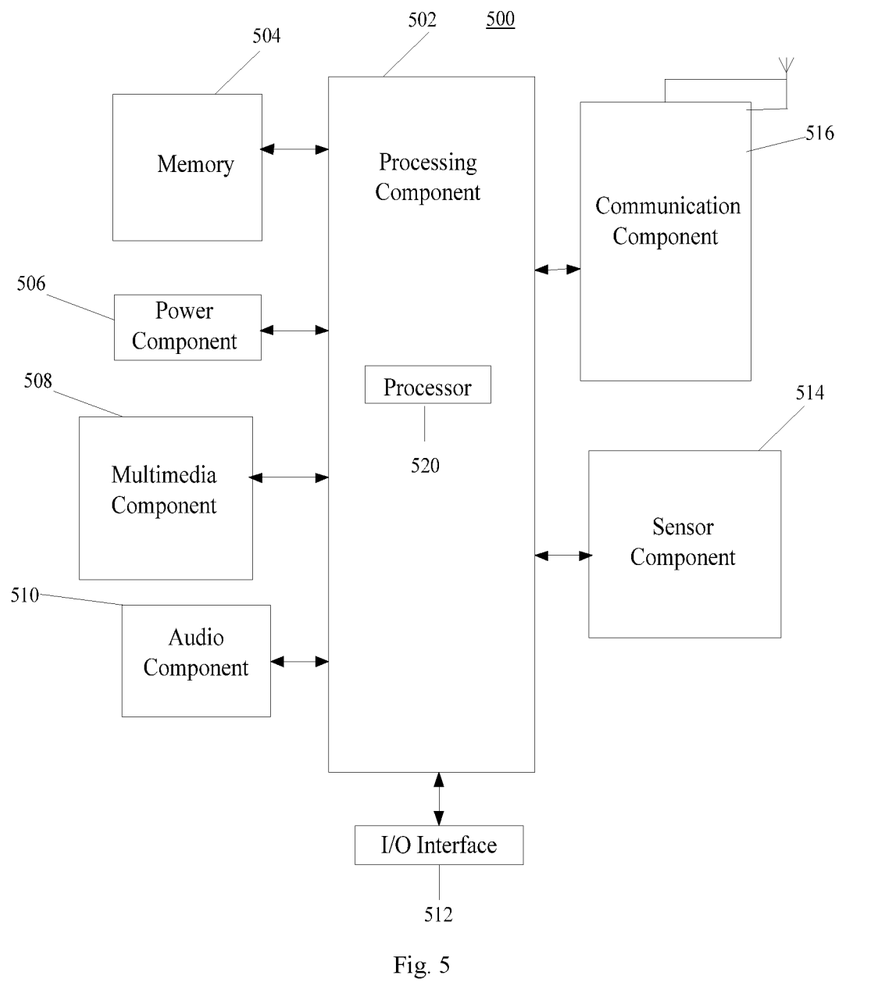
FIG. 5 is a block diagram illustrating a device for displaying an application page, according to an example.

FIG. 5 is a block diagram illustrating a device 500 for displaying an application page, according to an example. For example, the device 500 may be a mobile phone, a computer, a digital broadcast, a messaging device, a gaming console, a tablet, a medical device, exercise equipment, a personal digital assistant, and the like.

Referring to FIG. 5, the device 500 may include one or more of the following components: a processing component 502, a memory 504, a power component 506, a multimedia component 508, an audio component 510, an input/output (I/O) interface 512, a sensor component 514, and a communication component 516.

The processing component 502 typically controls overall operations of the device 500, such as the operations associated with display, telephone calls, data communications, camera operations, and recording operations. The processing component 502 may include one or more processors 520 to execute instructions to perform all or part of the steps in the above described methods. Moreover, the processing component 502 may include one or more modules which facilitate the interaction between the processing component 502 and other components. For instance, the processing component 502 may include a multimedia module to facilitate the interaction between the multimedia component 508 and the processing component 502.

The memory 504 is configured to store various types of data to support the operation of the device 500. Examples of such data include instructions for any applications or methods operated on the device 500, contact data, phonebook data, messages, pictures, video, etc. The memory 504 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 506 provides power to various components of the device 500. The power component 506 may include a power management system, one or more power sources, and any other components associated with the generation, management, and distribution of power in the device 500.

The multimedia component 508 includes a screen providing an output interface between the device 500 and the user. In some examples, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some examples, the multimedia component 508 includes a front camera and/or a rear camera. The front camera and the rear camera may receive an external multimedia datum while the device 500 is in an operation mode, such as a photographing mode or a video mode. Each of the front camera and the rear camera may be a fixed optical lens system or have focus and optical zoom capability.

The audio component 510 is configured to output and/or input audio signals. For example, the audio component 510 includes a microphone ("MIC") configured to receive an external audio signal when the device 500 is in an operation mode, such as a call mode, a recording mode, and a voice recognition mode. The received audio signal may be further stored in the memory 504 or transmitted via the communication component 516. In some examples, the audio component 510 further includes a speaker to output audio signals.

The I/O interface 512 provides an interface between the processing component 502 and peripheral interface modules, such as a keyboard, a click wheel, buttons, and the like. The buttons may include, but are not limited to, a home button, a volume button, a starting button, and a locking button.

The sensor component 514 includes one or more sensors to provide status assessments of various aspects of the device 500. For instance, the sensor component 514 may detect an open/closed status of the device 500, relative positioning of components, e.g., the display and the keypad, of the device 500, a change in position of the device 500 or a component of the device 500, a presence or absence of user contact with the device 500, an orientation or an acceleration/deceleration of the device 500, and a change in temperature of the device 500. The sensor component 514 may include a proximity sensor configured to detect the presence of nearby objects without any physical contact. The sensor component 514 may also include a light sensor, such as a CMOS or CCD image sensor, for use in imaging applications. In some examples, the sensor component 514 may also include an accelerometer sensor, a gyroscope sensor, a magnetic sensor, a pressure sensor, or a temperature sensor.

The communication component 516 is configured to facilitate communication, wired or wirelessly, between the device 500 and other devices. The device 500 can access a wireless network based on a communication standard, such as WiFi, 2G, or 3G, or a combination thereof. In one example, the communication component 516 receives a broadcast signal or broadcast associated information from an external broadcast management system via a broadcast channel. In one example, the communication component 516 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In examples, the device 500 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In examples, there is also provided a non-transitory computer-readable storage medium including instructions, such as included in the memory 504, executable by the processor 520 in the device 500, for performing the above-described methods. For example, the non-transitory computer-readable storage medium may be a ROM, a RAM, a CD-ROM, a magnetic tape, a floppy disc, an optical data storage device, and the like.

In examples of the present disclosure, there is provided a computer-readable storage medium having stored therein an instruction that, when executed by a processor of a terminal, causes the terminal to perform the method described in any example hereinbefore. The method includes: displaying a designated entry of an application; acquiring a configuration file of the application when a triggering operation to the designated entry is detected; and generating a native page of the application according to the configuration file of the application and displaying the native page of the application, in a case that the application is not installed in an operating system of a terminal.

In an example of the present disclosure, the designated entry is provided by the operating system of the terminal.

In another example of the present disclosure, displaying a designated entry of the application includes: displaying a searching entry provided by the operating system, and acquiring an application identifier inputted at the searching entry; sending a search request to a server, where the search request includes the application identifier, and the server is configured to feed back a configuration file corresponding to the application identifier; and caching the configuration file corresponding to the application identifier when the configuration file corresponding to the application identifier is received and displaying the designated entry.

In another example of the present disclosure, acquiring a configuration file of the application when a triggering operation to the designated entry is detected includes: acquiring the configuration file of the application cached when the triggering operation to the designated entry is detected.

In another example of the present disclosure, the native page of the application includes an option of adding a shortcut, and the method further includes: adding the shortcut on a homepage of the operating system when a triggering operation to the option of adding the shortcut is detected in process of displaying the native page of the application.

In another example of the present disclosure, the configuration file of the application includes a statement describing the application page, and generating a native page of the application according to the configuration file of the application includes: invoking a framework file in the operating system based on the configuration file of the application; and analyzing the statement through the framework file and generating the native page of the application.

Other examples of the present disclosure will be apparent to those skilled in the art from consideration of the specification and practice of the present disclosure disclosed here. This application is intended to cover any variations, uses, or adaptations of the present disclosure following the general principles thereof and including such departures from the present disclosure as come within known or customary practice in the art. It is intended that the specification and examples be considered as exemplary only.

The present disclosure may include dedicated hardware implementations such as application specific integrated circuits, programmable logic arrays and other hardware devices. The hardware implementations can be constructed to implement one or more of the methods described herein. Applications that may include the apparatus and systems of various examples can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the computing system disclosed may encompass software, firmware, and hardware implementations. The terms "module," "sub-module," "circuit," "sub-circuit," "circuitry," "sub-circuitry," "unit," or "sub-unit" may include memory (shared, dedicated, or group) that stores code or instructions that can be executed by one or more processors.

It will be appreciated that the present disclosure is not limited to the exact construction that has been described above and illustrated in the accompanying drawings, and that various modifications and changes can be made without departing from the scope thereof.

What is claimed is:

1. A method for displaying an application page by using a device, comprising:
   displaying a designated entry of an application;
   acquiring a configuration file of the application when a triggering operation to the designated entry is detected;
   obtaining a statement describing the application page from the configuration file;
   analyzing the statement into one or more display elements;
   generating a first virtual tree structure including the one or more display elements;
   converting the one or more display elements included in the first virtual tree structure into one or more views to obtain a second tree structure including the one or more views;
   generating an operable native page of the application by performing page rendering according to the one or more views, wherein the operable native page of the application simulates the application page under installation while allowing the application to be operated without being installed on the device; and displaying the operable native page of the application when the application is not installed in an operating system of the device.

2. The method according to claim 1, wherein the designated entry is provided by the operating system of the device.

3. The method according to claim 1, wherein displaying the designated entry of the application comprises:
displaying a searching entry provided by the operating system of the device, and acquiring an application identifier inputted via the searching entry;
sending a search request to a server, wherein the search request comprises the application identifier, wherein the server is configured to feed back the configuration file corresponding to the application identifier; and
caching the configuration file corresponding to the application identifier when the configuration file corresponding to the application identifier is received and displaying the designated entry.

4. The method according to claim 3, wherein acquiring the configuration file of the application when the triggering operation to the designated entry is detected comprises:
acquiring the configuration file of the application that is cached when the triggering operation to the designated entry is detected.

5. The method according to claim 1, wherein the native page of the application comprises an option of adding a shortcut, and the method further comprises:
adding the shortcut on a homepage of the device when a triggering operation to the option for adding the shortcut is detected while displaying the native page of the application.

6. The method according to claim 1, wherein the configuration file of the application comprises the statement describing the application page, and generating the native page of the application further comprises:
invoking a framework file in the operating system of the device based on the configuration file of the application; and
analyzing the statement through the framework file.

7. A device for displaying an application page, comprising:
one or more processors; and
a non-transitory computer-readable storage medium for storing instructions executable by the one or more processors, wherein the one or more processors are configured to:
display a designated entry of an application;
acquire a configuration file of the application when a triggering operation to the designated entry is detected;
obtain a statement describing the application page from the configuration file;
analyze the statement into one or more display elements;
generate a first virtual tree structure including the one or more display elements;
convert the one or more display elements included in the first virtual tree structure into one or more views to obtain a second tree structure including the one or more views;
generate an operable native page of the application by performing page rendering according to the one or more views, wherein the operable native page of the application simulates the application page under installation while allowing the application to be operated without being installed on the device; and display the operable native page of the application when the application is not installed in an operating system of the device.

8. The device according to claim 7, wherein the designated entry is provided by the operating system of the device.

9. The device according to claim 7, wherein the one or more processors configured to display the designated entry of the application is further configured to:
display a searching entry provided by the operating system of the device and acquire an application identifier inputted via the searching entry;
send a search request to a server, wherein the search request comprises the application identifier, wherein the server is configured to feed back the configuration file corresponding to the application identifier; and
cache the configuration file corresponding to the application identifier when the configuration file corresponding to the application identifier is received and displaying the designated entry.

10. The device according to claim 9, wherein the one or more processors configured to acquire the configuration file of the application when the triggering operation to the designated entry is detected is further configured to:
acquire the configuration file of the application that is cached when the triggering operation to the designated entry is detected.

11. The device according to claim 7, wherein the native page of the application comprises an option of adding a shortcut, and the one or more processors are further configured to:
add the shortcut on a homepage of the device when a triggering operation to the option for adding the shortcut is detected while the native page of the application is displayed.

12. The device according to claim 7, wherein the configuration file of the application comprises the statement describing the application page, and the one or more processors configured to generate the native page of the application is further configured to:
invoke a framework file in the operating system of the device based on the configuration file of the application; and
analyze the statement through the framework file.

13. A non-transitory computer-readable storage medium having stored therein at least one instruction that is executable by one or more processors for displaying an application page, wherein the at least one instruction, when executed, causes the one or more processors to perform acts comprising:
displaying a designated entry of an application;
acquiring a configuration file of the application when a triggering operation to the designated entry is detected;
obtaining a statement describing the application page from the configuration file;
analyzing the statement into one or more display elements;
generating a first virtual tree structure including the one or more display elements;
converting the one or more display elements included in the first virtual tree structure into one or more views to obtain a second tree structure including the one or more views;
generating an operable native page of the application by performing page rendering according to the one or more views, wherein the operable native page of the application simulates the application page under installation while allowing the application to be operated without being installed on a device displaying the operable native page of the application; and displaying the operable native page of the application when the application is not installed in an operating system of the device.

14. The non-transitory computer-readable storage medium according to claim 13, wherein the designated entry is provided by the operating system of the device.

15. The non-transitory computer-readable storage medium according to claim 13, wherein the at least one instruction for displaying the designated entry of the application further causes the one or more processors to perform:

displaying a searching entry provided by the operating system of the device and acquiring an application identifier inputted via the searching entry;

sending a search request to a server, wherein the search request comprises the application identifier, wherein the server is configured to feed back the configuration file corresponding to the application identifier; and caching the configuration file corresponding to the application identifier when the configuration file corresponding to the application identifier is received and displaying the designated entry.

16. The non-transitory computer-readable storage medium according to claim 15, wherein the at least one instruction for acquiring the configuration file of the application when the triggering operation to the designated entry is detected further causes the one or more processors to perform:

acquiring the configuration file of the application that is cached when the triggering operation to the designated entry is detected.

17. The non-transitory computer-readable storage medium according to claim 13, wherein the native page of the application comprises an option of adding a shortcut, and the at least one instruction further causes the one or more processors to perform:

adding the shortcut on a homepage of the device when a triggering operation to the option for adding the shortcut is detected while the native page of the application is displayed.

18. The non-transitory computer-readable storage medium according to claim 13, wherein the configuration file of the application comprises the statement describing the application page, and the at least one instruction for generating the native page of the application further causes the one or more processors to perform:

invoking a framework file in the operating system of the device based on the configuration file of the application; and analyzing the statement through the framework file.

* * * * *